United States Patent Office 3,554,952
Patented Jan. 12, 1971

3,554,952
AQUEOUS DISPERSION OF AMINOALKYL SILANE-ALDEHYDE REACTION PRODUCTS
Edwin P. Plueddemann, Midland, Mich., assignor to Dow Corning Corporation, Midland, Mich., a corporation of Michigan
No Drawing. Filed Jan. 21, 1969, Ser. No. 792,842
Int. Cl. C08g 51/24
U.S. Cl. 260—29.2                                3 Claims

ABSTRACT OF THE DISCLOSURE

Aminosilanes such as $(CH_3O)_3Si(CH_2)_3NH(CH_2)_2NH_2$ are mixed with aldehydes such as formaldehyde to give water-soluble reaction products. These products are useful as bonding agents between organic resins and siliceous and other surfaces.

---

It is known that aminoalkylsilanes such as those containing the grouping $Si(CH_2)_3NH_2$ or $$Si(CH_2)_3NH(CH_2)_2NH_2$$

are excellent coupling agents for phenolic resins on glass substrates. These coupling agents have also been used to some extent with epoxide resins. However, such coupling agents suffer from disadvantages. For one thing they are not reactive with a wide variety of organic resins. Secondly, they often cause yellowing when the resin coated substrate is heated. This is particularly undesirable in the case of glass fabrics.

It is the object of this invention to produce a coupling agent which will be effective with a wider variety of organic resins than the above alkylaminosilanes. It is also the object to improve the quality of the bond between the organic resin and the substrate.

It has been found most unexpectedly that the reaction products infra are water soluble and the solutions are quite stable in spite of the highly reactive nature of material.

This invention relates to an aqueous solution formed by mixing a silane of the formula:

$$X_n \overset{R_{3-n}}{\underset{|}{Si}} R'NH(CH_2)_2NH_2 \text{ or } X_n \overset{R_{3-n}}{\underset{|}{Si}} R'NR''H$$

and at least one mol of formaldehyde or acetaldehyde per mol of silane in which R is an aliphatic hydrocarbon radical of from 1 to 3 carbon atoms, R' is an alkylene radical of from 1 to 6 carbon atoms, R'' is hydrogen or an aliphatic hydrocarbon radical of from 1 to 3 carbon atoms, X is a hydrocarbonoxy group attached to the Si through a SiOC bond and derived from a water soluble alcohol and $n$ is an integer from 1 to 3.

The precise structure of the reaction product of this invention cannot be determined. It is believed, however, without limiting the invention thereto, that the aldehyde reacts with the NH groups to produce the structure $NCH_2OH$ or $$\overset{CH}{\underset{|}{N}}CHOH$$

These methylol groups are quite reactive and can condense with themselves to form resinous structures. Thus, the reaction product of the aldehyde with the aminosilane is highly reactive at both ends. That is, the X groups hydrolyze in aqueous solution to produce hydroxyls which, of course, can condense to form polymeric siloxanes or can react with the surface of the substrate the methylol group at the other end reacts quite readily forming polymeric condensation products and can react with functional groups in organic resins. Thus, the products of this invention are excellent film-forming materials and this in part accounts for their excellent performance as coupling agents between substrates such as glass and a wide variety of resins.

It has been found that one can employ from one to any number of mols of the aldehyde per mol of the silane. In general, the stability of the aqueous dispersion increases as the amount of aldehyde increases. Thus, an aqueous dispersion containing 8 mols of aldehyde per mol of silane is more stable than an aqueous dispersion containing 1 mol of aldehyde per mol of silane. The stability of the aqueous dispersion can be increased by employing an acid such as acetic acid in conjunction with the aldehyde. There is no advantage in using more than one mol of acid per N atom in the silane.

When the amount of aldehyde exceeds about 6 mols per mol of silane no improvement in the stability of the aqueous solution is obtained by employing acid. However, the employment of acid enables one to use less of the formaldehyde or acetaldehyde and in some cases this is beneficial, both with respect to atmospheric contamination and to cost.

Any acid can be used in this invention which will form an amine salt. Thus, one can use mineral acids such as hydrochloric, phosphoric, nitric, or sulfuric or organic acids such as acetic, formic, benzene sulfonic, chloroacetic or trifluoroacetic.

X can be any hydrocarbonoxy group derived from a water soluble alcohol and is attached to the silicon via a SiOC bond. A hydrocarbonoxy radical is one which contains C, H and O the latter being in the form of ether, OH and carboxylic ester groups. Specific examples of hydrocarbonoxy groups are alkoxy groups such as methoxy, ethoxy or isopropoxy; hydroxy-alkoxy groups such as beta-hydroxyethyl or beta-hydroxypropyl; ether radicals such as beta-methoxyethoxy or beta-ethoxyethoxy and ester groups such as $-OCH_2CH_2OOCCH_3$ or $$-OCH_2CH_2OOCCH_2OH$$

As is well known the hydrocarbonoxy groups hydrolyze in water to the corresponding silanol and the latter is actually the water soluble species.

In preparing the products of this invention one can disperse the silane in water and then add the aldehyde in the proper molar amount. Alternatively, one can simply add the silane to a solution of the aldehyde. In other words, the order of addition of the products in this invention is not critical and mixing the aldehyde with the water soluble hydrolyzate of the silane is the full equivalent of mixing the silane per se and the aldehyde. When less than 3 mols of aldehyde per mol of silane [1] is employed it is often necessary that acid be added to the silane prior to the addition of the aldehyde, otherwise, one gets almost instant precipitation of the reaction products from the aqueous solution.

If desired, one can first dissolve the silane in a water soluble solvent such as methanol, ethanol, dioxane or the monomethyl ether of ethylene glycol before mixing with the aldehyde and water.

For the purpose of this invention R and R'' can be any aliphatic hydrocarbon radical from 1 to 3 carbon atoms such as methyl, ethyl, vinyl or allyl. R' can be any alkylene radical from 1 to 6 carbon atoms such as methylene, dimethylene, trimethylene, or hexamethylene. R' can also be a branched alkylene radical such as $$\overset{CH_3}{\underset{|}{-CH_2CH-CH_2-}}$$

The products of this invention are quite useful as coupling agents between glass and other siliceous sur-

---

[1] In those cases where the aldehyde is added to the water soluble hydrolyzate the mols are based on the amount of silane used to form the hydrolyzate.

faces and organic resins. They can be used with a wide variety of resins which are reactive toward methylol groups such as, for example, phenolic resins, melamine resins, ureaformaldehyde resins, epoxy resins or polyacrylate resins in which there are reactive hydroxyl or carboxyl groups. The materials, in fact, can be used with any polymeric material having reactive hydroxyl, amino or carboxyl groups attached to the polymer chain.

The compositions of this invention can be used for coupling with substrates in any form such as solid sheet materials, fibers or particulated fillers or pigments.

The following examples are illustrative only and should not be construed as limiting the invention which is properly delineated in the appended claims.

EXAMPLE 1

In each case shown below the silane was added to 30% formaldehyde in water solution in the amount sufficient to give the mol ratios shown below. In each case a clear aqueous solution was obtained.

| Silane | Mol ratio of formaldehyde to silane |
|---|---|
| $(CH_3O)_3Si(CH_2)_3NHCH_3$ | 1:1 |
| $\underset{\underset{(CH_3)_2}{\|}}{CH_3O}Si(CH_2)_3NH(CH_2)_2NH_2$ | 2:1 and 3:1 |
| $(CH_3E)_3SiCH_2NHCH_2CH_2NH_2$ | 3:1 |

EXAMPLE 2

220 parts by weight (1 mol) of $$(CH_3O)_3Si(CH_2)_3NH(CH_2)_2NH_2$$

and 60 parts by weight (1 mol) of acetic acid were mixed and then added to 200 parts by weight of a 30% formaldehyde solution in water (2 mols of formaldehyde per mol of silane). After an exothermic reaction the reaction product was diluted to 0.5% by weight with additional water and the aqueous solution was applied to heat-cleaned glass cloth. The cloth was thereafter dried 30 minutes at room-temperature and then heated for 7 minutes at 230° F.

The treated glass was then laminated with epoxy resin to obtain a 14-ply laminate containing 70% by weight glass. The laminate was cured by standard procedure and the strength was determined both under dry conditions and after a 2-hour boil in water as shown in the table below:

| Sample | Flexural strength in p.s.i. Dry | Flexural strength in p.s.i. Wet | Compressive strength in p.s.i. Dry | Compressive strength in p.s.i. Wet |
|---|---|---|---|---|
| Treated glass | 72,200 | 69,600 | 49,100 | 44,000 |
| Blank | 71,300 | 51,700 | 61,800 | 27,400 |

It is noted that there was a vast improvement in the strength of the laminate after a 2 hour boil as between the treated and untreated glass.

EXAMPLE 3

The silane $(CH_3O)_3Si(CH_2)_3NH(CH_2)_2NH_2$ was diluted with an equal weight of water and 1 mol of HCl per mol of silane was added. The mixture was then mixed with 30% formaldehyde in water solution in amount to give 3 mols of formaldehyde per mol of silane. The resulting solution contains about 28% by weight solids. The water solution was placed on plate glass and allowed to evaporate whereupon a clear film was obtained.

The above experiment was repeated employing 1 mol of phosphorous acid in the place of the hydrochloric acid. A clear film was obtained when the solution was evaporated on glass plate and the film had better resistance to discoloration at 150° C.

EXAMPLE 4

Equivalent results are obtained when acetaldehyde is substituted for the formaldehyde in the procedure of Example 1.

EXAMPLE 5

Clear aqueous solutions are obtained when the following silanes are mixed with 30% by weight formaldehyde in water solutions in amount to give 8 mols of formaldehyde per mol of silane:

$$\underset{\underset{C_2H_5}{\|}}{(C_2H_5O)_2}Si(CH_2)_3NHC_2H_5$$

$$(CH_3OCH_2CH_2O)_3Si(CH_2)_6NHCH_2CH_2NH_2$$

$$\underset{\underset{C_2H_3}{\|}}{(CH_3O)_3}Si(CH_2)_3NH(CH_2)_2NHC_3H_7$$

and $$\underset{\underset{CH_3}{\|}}{(CH_3O)_3}SiCH_2CHCH_2NHCH_2CH_2NH_2$$

EXAMPLE 6

220 parts by weight (1 mol) of $$(C_2H_5O)_3Si(CH_2)_3NH_2$$

and 60 parts by weight (1 mol) of acetic acid were mixed with 1000 parts by weight of water and then added to 200 parts by weight of a 30% formaldehyde solution in water. After an exothermic reaction a clear, stable solution was obtained. A portion of this solution on glass was dried at 120° to obtain a clear, hard polymeric film with good color.

That which is claimed is:

1. An aqueous solution of a composition of matter prepared by mixing a silane of the formula $$X_nSiR'NH(CH_2)_2NH_2 \text{ or } X_nSiR'NR''H$$
$$R_{3-n} \qquad\qquad R_{3-n}$$

and at least one mol of formaldehyde or acetaldehyde per mol of silane in which:

R is an aliphatic hydrocarbon radical of from 1 to 3 carbon atoms,
R' is an alkylene radical of from 1 to 6 carbon atoms,
R" is hydrogen or an aliphatic hydrocarbon radical of from 1 to 3 carbon atoms,
X is a hydrocarbonoxy group attached to the Si through a SiOC bond and derived from a water soluble alcohol, and
n is an integer from 1 to 3 inclusive.

2. The composition of claim 1 in which n is 3, R' is trimethylene and the aldehyde is formaldehyde.

3. The composition of claim 1 in which there is at least 1 mol of acid per mol of silane.

References Cited

UNITED STATES PATENTS 3,109,854  11/1963  Ender _____ 260—448.8

HOSEA E. TAYLOR, Primary Examiner

MELVYN I. MARQUIS, Assistant Examiner

U.S. Cl. X.R.

117—124; 161—185, 206; 260—2, 29.4, 37, 46.5, 72, 448.2, 448.8